Patented June 23, 1953

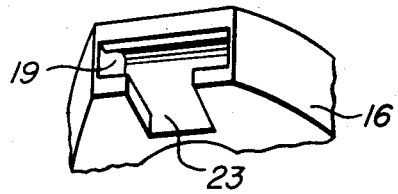
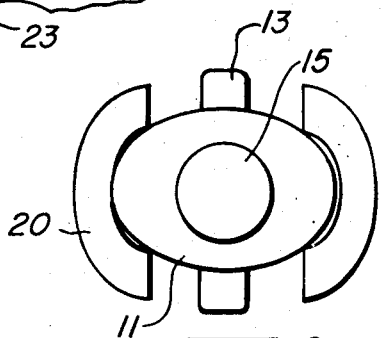
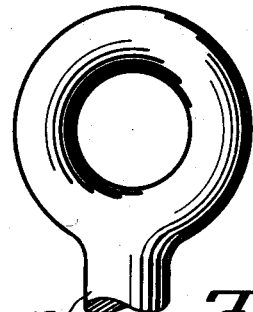
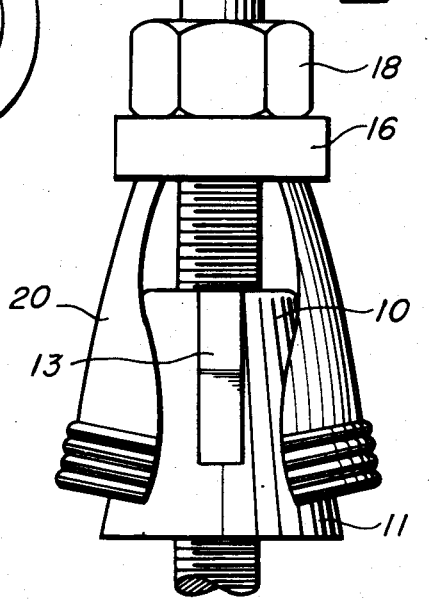
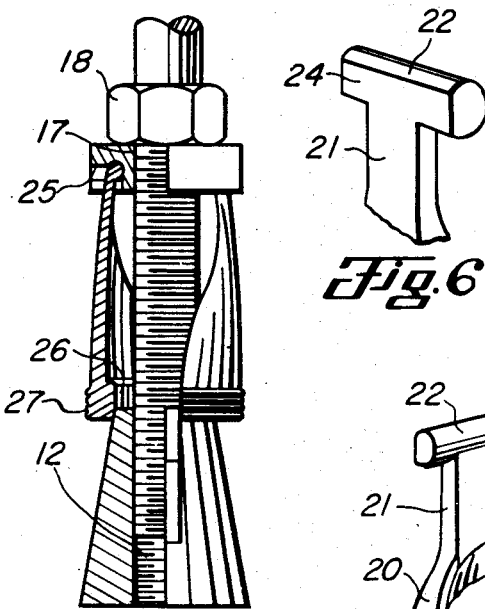
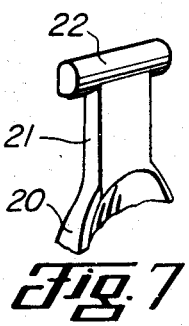
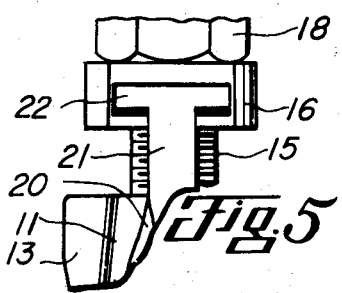
Harley R. Ogburn
INVENTOR.

2,642,768

UNITED STATES PATENT OFFICE 2,642,768

ROCK ANCHOR

Harley R. Ogburn, Henderson, Tex.

Application June 17, 1949, Serial No. 99,693

1 Claim. (Cl. 85—2.4)

This invention relates to new and useful improvements in rock anchors.

One object of the invention is to provide an improved anchor especially adapted for use in bore holes in rock formations or concrete and which is sturdy and simple.

Another object of the invention is to provide an improved rock anchor having a conoidal, expanding nut which is elliptical in cross-section so as to provide ovate guide surfaces at its greatest width for receiving pivotal jaws whereby the nut is held against rotation when the bolt, on which said nut is threaded, is rotated to expand the jaws.

A further object of the invention is to provide a rock anchor having a hanger and jaws suspended therefrom each jaw having a T-shaped shank with a flat rocker removably engaged in a T-shaped socket in the hanger whereby said jaws are hinged and help against displacement from said hanger so long as held below a horizontal plane.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is an elevation of an anchor constructed in accordance with the invention and shown in its expanded position, Fig. 2 is a perspective view of one end of the hanger showing one of the sockets, Fig. 3 is a bottom plan of the anchor, Fig. 4 is a view of the anchor, partly in elevation and partly in section, shown in its retracted position, Fig. 5 is an end elevation of the hanger and portions of adjacent parts, and Figs. 6 and 7 are perspective views of the shank end of one of the jaws.

In the drawing, the number 10 designates an expanding member or conoidal nut which is elliptical in cross-section. At each side of its greatest dimension or width, the nut has upwardly and inwardly inclined, co-extensive guide surfaces 11 which are arcuate in cross-section. An axial, screw-threaded bore 12 extends longitudinally through the nut. At substantially right angles to the guide surfaces 11, with respect to the bore, the nut has wings 13 at its upper portion, the lower portion of each wing being beveled as shown at 14.

An eye bolt 15 is screw-threaded in the bore 12. A flat hanger 16 having an axial bore 17 slightly larger in diameter than the bolt 15 is freely movable on the latter. A head 18, which may be in the form of a hexagonal nut, is jammed on the bolt at the upper end of its screw-threads and the hanger 16 is confined between the nut 10 and the head.

The hanger is transversely elongated and has at each end a transverse socket 19. Jaws or anchor members 20 have reduced shanks 21 at their upper ends made integral with the medial portions of transverse, substantially cylindrical rockers 22, whereby the upper end of each jaw is given a T-shape. Each socket 19 extends horizontally inward from the end of the hanger and has a co-extensive slot 23 in its bottom, whereby the socket is given a T-shape in vertical section. When the rocker 22 is inserted in the socket, the shank 21 depends through the slot 23 thereof whereby the jaw is hinged to swing.

It is noted that the outer side of each rocker is cut off flush with the outer surface of the shank 21 to provide a flat face 24 (Fig. 4). Each socket has a depending lip 25 overhanging its entrance. When the jaw is raised to a horizontal position with the flat face 24 of its rocker uppermost, said rocker is thin enough to slide into the socket 19 under the lip 25. When the jaw is swung inwardly against the guide surface 11, the rocker is rotated and held in the socket by the overhanging lip. While each jaw is free to swing, it is held in place without the use of fastenings and may be readily removed by swinging it outwardly to a horizontal position.

Each jaw 20 is arced or curved transversely so as to be of concave-convex form and, at its bottom, has an interior arcuate shoe 26 which rides on one of the guide surfaces and conforms to the curvature thereof. On the outer surface of each jaw, arcuate ribs 27 are formed at the bottom thereof for the purpose of engaging the wall of a bore hole made in the ground, particularly in rock.

When the anchor is lowered into the bore hole, the nut 10 is positioned on the lower end of the bolt 15 (Fig. 4) and the head 18 is jammed on the upper end of the screw-threads of said bolt. As the anchor moves downwardly in the hole, the ribs 27 of the jaws 20 are in engagement with the wall of the hole so that the bolt moves through the bore 17 of the hanger 16 until the head engages said hanger, whereby the lower ends of said jaws are positioned at the top of the nut 10.

As the descent of the anchor is continued down the hole, the parts remain in their retracted positions because of the drag of the jaws 20 on the wall of said hole. When the desired depth is reached, the descent of the anchor is stopped and the eye bolt 15 is rotated. As a rule, the jaws are in engagement with the wall of the hole and since the guide surfaces 11 are at the widest dimension of the nut 10, said nut will be held against rotation or to such a limited rotation that the same is elevated upon rotation of the bolt.

When the nut 10 is elevated, the shoes 26 ride upwardly on the guide surfaces 11 so as to expand the jaws as shown in Fig. 1. Rotation of the eye bolt and the elevation of the nut is continued until the ribs 27 bite into the wall of the hole and the shoes are wedged against the surfaces 11 and further movement of the parts is stopped. If it should happen that upon the initial rotation of eye bolt the nut should rotate, the wings 13 engage the jaws preventing further rotation of the nut. The anchor may be released and retracted by reverse rotation of the eye bolt, whereby the nut will be lowered.

I am aware that it is common practice to expand pivoted jaws by means of a conoidal nut into which a bolt is screw-threaded, but so far as I know the provision of a conoidal nut which is elliptical in cross-section and has ovate guide surfaces is new and novel, particularly in an earth or rock anchor. The combination of the eye bolt 15, the head 18 jammed thereon and the hanger 16 restrained by the head, with jaws and their particular pivotal mountings, produces an anchor which is simple, sturdy and efficient, easy to install and remove and unique in structure. It will be noted that only the shoes 27 engage on the surfaces 11, the remainder of the inner surfaces of the jaws being free of contact with the nut.

The foregoing description of the invention is explanatory thereof and various changes in the size, shape and materials, as well as in the details of the illustrated construction may be made, within the scope of the appended claim, without departing from the spirit of the invention.

What I claim and desire to secure by Letters Patent is:

A rock anchor including, a transverse hanger having a bolt hole at its central portion and transverse sockets at each end opening outwardly and a depending lip overhanging each socket, the hanger having slots in the bottoms of the sockets, jaws having shanks at their upper ends carrying transverse rockers and being free of openings, the rockers engaging in the sockets and the shanks swinging through the slots, each rocker having a flat portion and a rounded portion so that the rockers may be inserted in its socket when the shank extends generally in a horizontal position and is retained in its socket by said depending lip when the shank is generally in a vertical position, the lower ends of the jaws having transversely curved inner sides, an eye-bolt passing loosely through the hanger, a nut screw-threaded on the bolt and engaging on top of the hanger, a conoidal nut threaded on the bolt between the jaws engaged on opposite sides by the curved inner sides of the jaws, said conoidal nut having a greater transverse dimension between said jaws and being held against rotation when the bolt is turned, and vertical wings protecting from the conoidal nut between the sides of opposite jaws.

HARLEY R. OGBURN.

References Cited in the file of this patent

UNITED STATES PATENTS

| Number | Name | Date |
|---|---|---|
| 138,568 | Littlejohn | May 6, 1873 |
| 610,308 | Seaman | Sept. 6, 1898 |
| 612,489 | Dean | Oct. 18, 1898 |
| 681,817 | Smith | Sept. 3, 1901 |
| 694,345 | Bennett | Mar. 4, 1902 |
| 696,587 | Palmer | Apr. 1, 1902 |
| 899,274 | Thomas | Sept. 22, 1908 |
| 1,066,512 | Masor | July 8, 1913 |
| 1,131,928 | Griffin | Mar. 16, 1915 |
| 1,179,472 | Tarleton | Apr. 18, 1916 |
| 1,412,581 | Tomkinson | Apr. 11, 1922 |

FOREIGN PATENTS

| Number | Country | Date |
|---|---|---|
| 39,579 | Germany | Dec. 14, 1886 |